Figure 1:
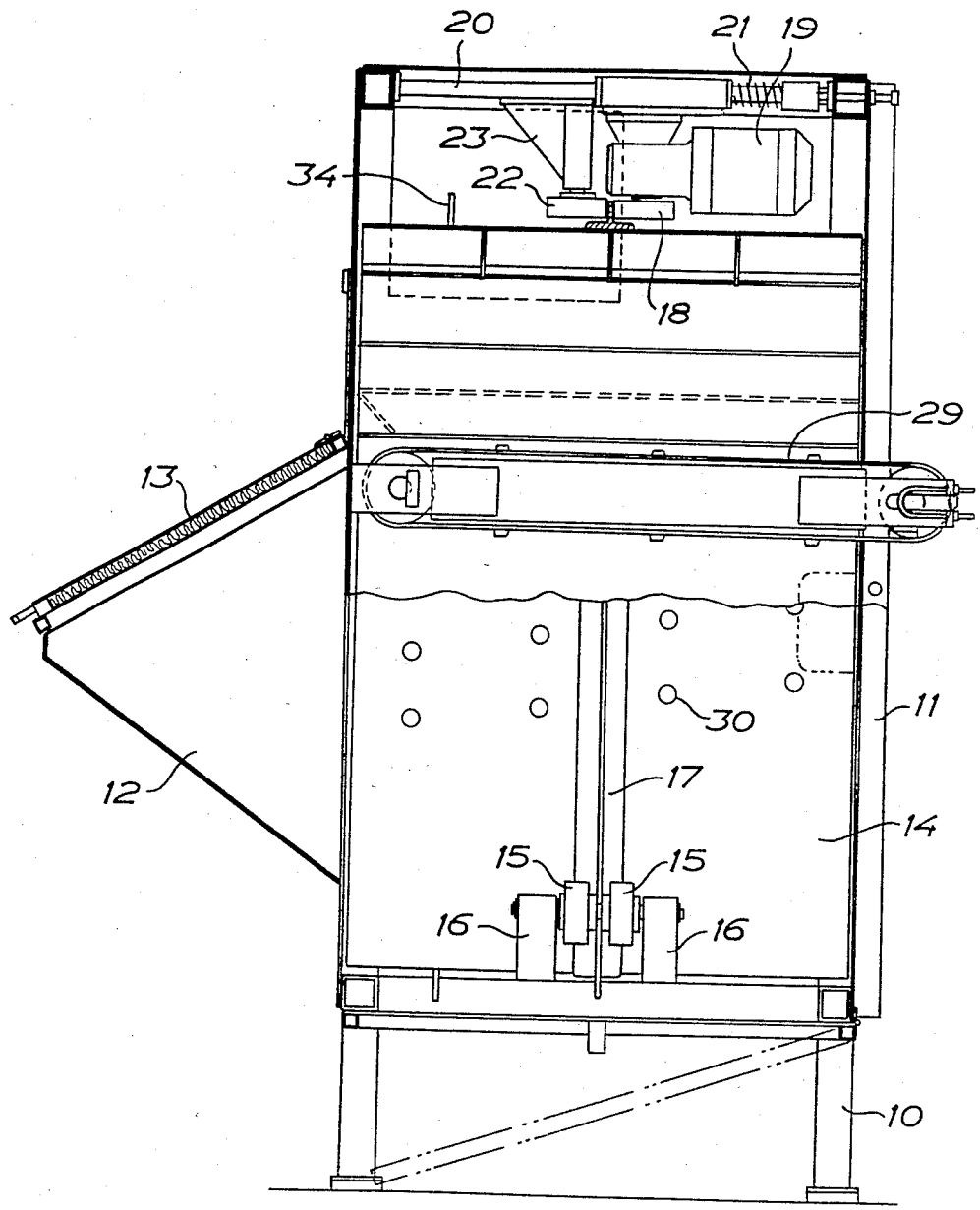

United States Patent [19]

Magnusson et al.

[11] Patent Number: 4,731,802
[45] Date of Patent: Mar. 15, 1988

[54] APPARATUS FOR COUNTING SUBSTANTIALLY CYLINDRICAL ARTICLES

[76] Inventors: Leif Magnusson, Bäckavägen 5, Helsingborg S-254 84; Ben Elwing, Drottgränd 14, Gislaved S-322 00, both of Sweden

[21] Appl. No.: 846,285

[22] Filed: Mar. 31, 1986

[51] Int. Cl.⁴ .................. B65G 47/14; G06M 7/00
[52] U.S. Cl. ............................................ 377/6; 377/53; 209/687; 209/551; 250/223 R; 235/98 C; 198/397
[58] Field of Search .................. 377/6, 53; 235/98 C; 198/397; 209/551, 687; 250/223

[56] References Cited

U.S. PATENT DOCUMENTS

| | | | |
|---|---|---|---|
| 854,443 | 5/1907 | Voorhees | 209/687 |
| 1,808,806 | 6/1931 | Cooper | 209/687 |
| 2,171,362 | 8/1939 | Gulliksen | 377/53 |
| 3,045,910 | 7/1962 | McLearn | 377/6 |
| 3,063,543 | 11/1962 | Schneider | 198/397 |
| 3,199,672 | 8/1965 | Charland | 209/551 |
| 3,322,274 | 5/1967 | Fox | 209/664 |
| 3,552,539 | 1/1971 | Rutter | 198/397 |
| 4,130,480 | 12/1978 | Loewenthal | 209/551 |
| 4,395,625 | 7/1983 | Schutt | 235/98 C |
| 4,472,819 | 9/1984 | Constantino | 377/6 |
| 4,583,635 | 4/1986 | Timmer et al. | 198/397 |

Primary Examiner—John S. Heyman
Attorney, Agent, or Firm—Merchant, Gould, Smith, Edell, Welter & Schmidt

[57] ABSTRACT

An apparatus for counting substantially cylindrical articles comprises a rotatable elevator cylinder having a circumferential series of compartments for the articles on the inside surface of the cylindrical wall thereof. Means are provided for sensing the presence of an article in each compartment when passing a predetermined position in the rotational path of the compartments, and for sensing the arrival of each compartment to said position, as well as means for making one count in dependence on the sensing of an article in said position.

2 Claims, 8 Drawing Figures

APPARATUS FOR COUNTING SUBSTANTIALLY CYLINDRICAL ARTICLES

The invention relates to an apparatus for counting substantially cylindrical articles and more particularly to an apparatus for counting emptied beverage cans.

The introduction of the return system for aluminium cans used for beverages such as beer and soft drinks, has created a need for a high cpacity apparatus which can count automatically at high speed cans which are deposited at a recovery place in large quantities, e.g. in large bags. Such apparatus should be able to handle cans of different sizes also if the cans are deformed or are filled with litter.

It might be expected that the principles of prior art apparatus for handling articles or different kinds such as coin counters, bottle cap sorters, rotary vane feeders, and vibrating feeders, could be applied also to an apparatus for counting cans, but it has been found that these prior art apparatus due to the fact that they are handling articles of a size, shape, and weight that are well defined cannot be used for counting cans the size, shape, and weight of which may vary from one can to the other.

One prior art apparatus for counting cans comprises a belt conveyor and a shaking table forming longitudinal chutes. The conveyor carries the cans to the shaking table at a predetermined speed. On the table the cans are orientated in the longitudinal direction of the chutes due to the shaking movement of the table, the cans at the same time being transported to the discharge end of the shaking table where the cans are discharged, falling down from the table at the edge thereof. The cans are counted by means of feelers or sensors associated with counters, when they fall down from the table. In another prior art construction of a can counter the shaking table is replaced by a second belt conveyor having cells for receiving the can therein, the cans being counted in a manner analogous to that applied when a shaking table is being used.

These prior art can counters do not operate satisfactorily if the cans are deformed, and moreover the transit time and the transit distance of the cans for counting each batch of cans are substantial, and, therfore, the apparatus is not well suited for counting cans supplied in batches each of which includes a great number of cans. The prior art apparatus requires large floor space, and the noise level thereof is high.

The primary purpose of the present invention is to provide an apparatus of the kind referred to above for counting in a rational manner deposited aluminium cans, but it should be pointed out that the apparatus of the invention can be used also for counting substantially cylindrical articles of other kinds.

A further purpose of the invention is to provide an apparatus of the kind referred to above which can count cans at high speed and at high accuracy also in case the size and degree of deformation of the cans vary within common limits.

In order to achieve said purpose and other purposes which will become apparent from the description which follows the invention provides an apparatus for counting substantially cylindrical articles comprising a cylinder having a circumferential series of compartments each for receiving one article, on the inside surface of the cylindrical wall of the cylinder, each compartment extending axially and opening towards the interior of the cylinder, means mounting the cylinder for rotation about a substantially horizontal axis, means for supplying articles to the interior of the cylinder at the lower region thereof, means for delivering articles from the interior of the cylinder at the upper region thereof, means for sensing the presence of an article in each compartment when passing a predetermined position in the rotational path of the compartments, means for sensing the arrival of each compartment to said position, and means for providing a counting signal in dependence on the sensing of an article in said position.

Figure 2:
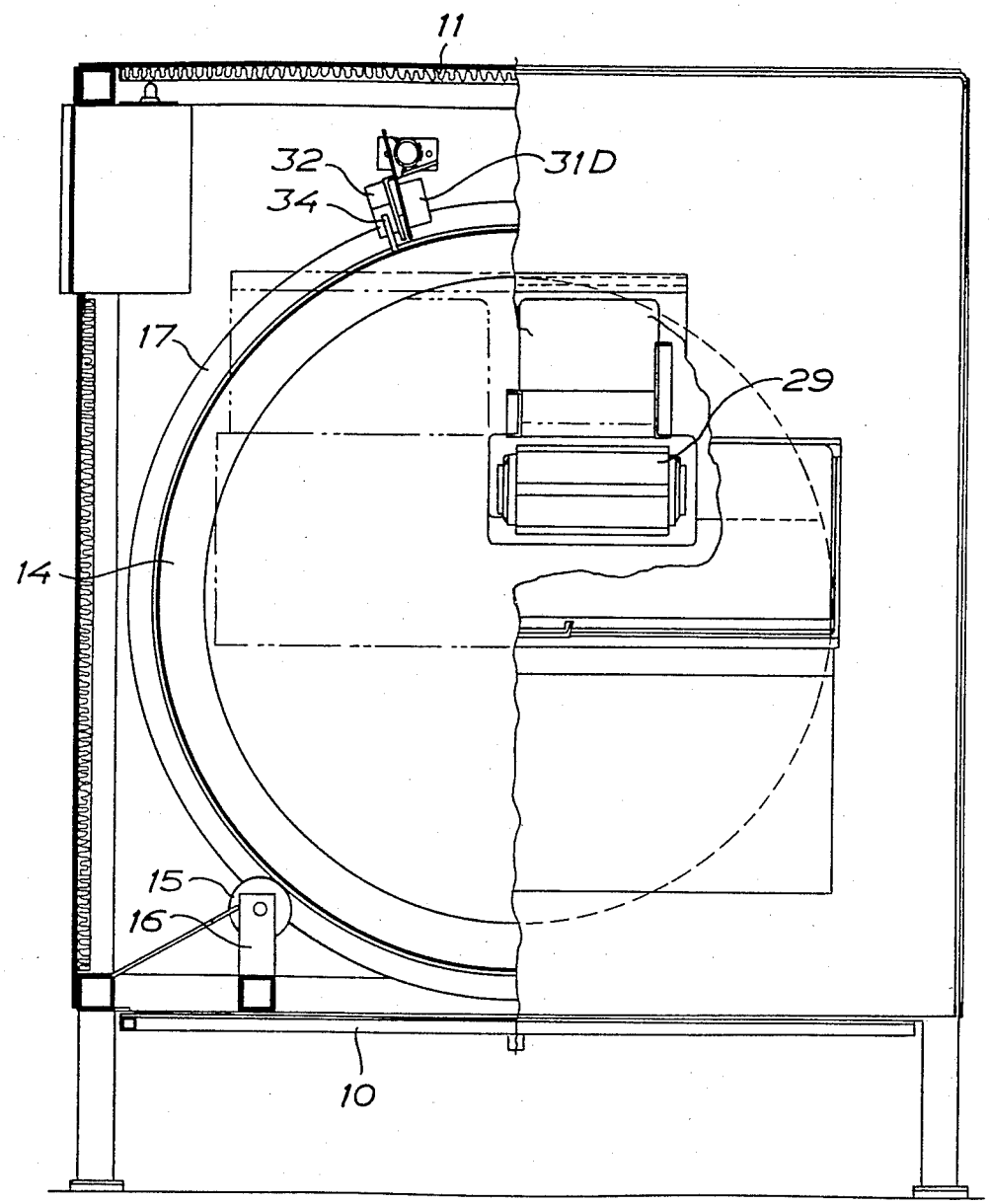
Figure 3:
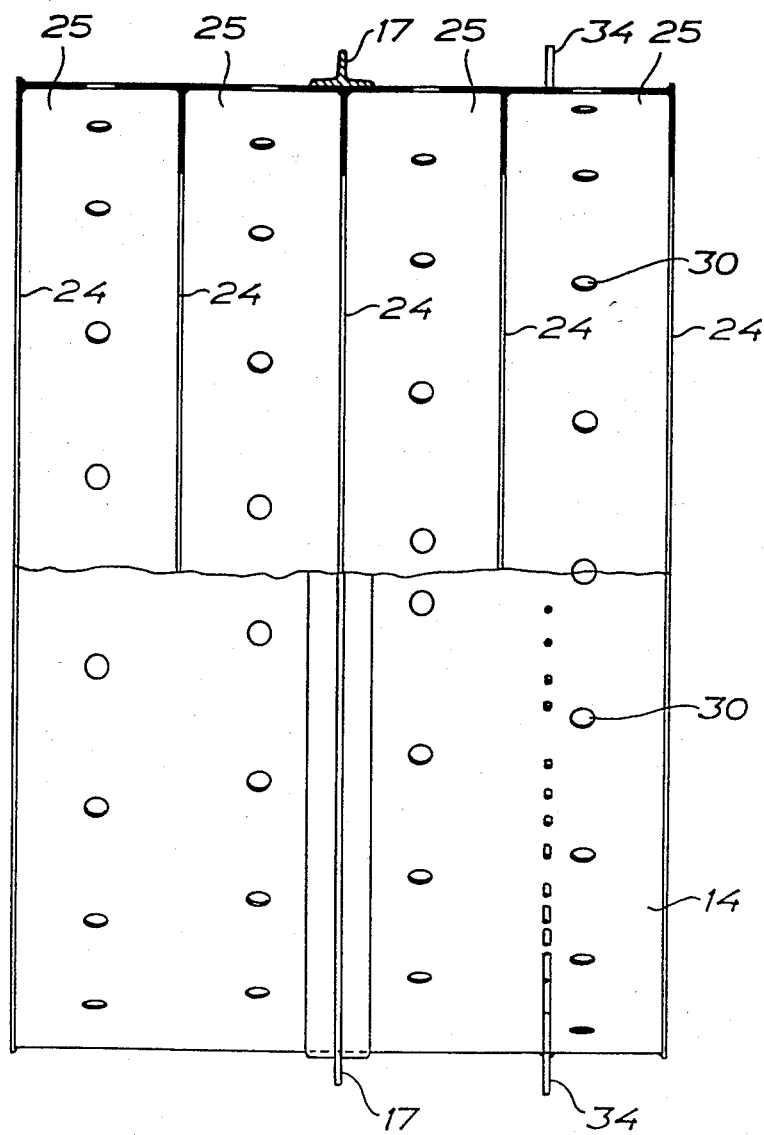

In order to illustrate the invention embodiments thereof will be described below reference being made to the accompanying drawings in which FIG. 1 is a vertical sectional view of an apparatus of the invention in one embodiment thereof, FIG. 2 is half a front view and half a vertical sectional view of the apparatus, FIG. 3 is half a top plan view and half a horizontal sectional view of the cylinder of the apparatus.

Figure 4:
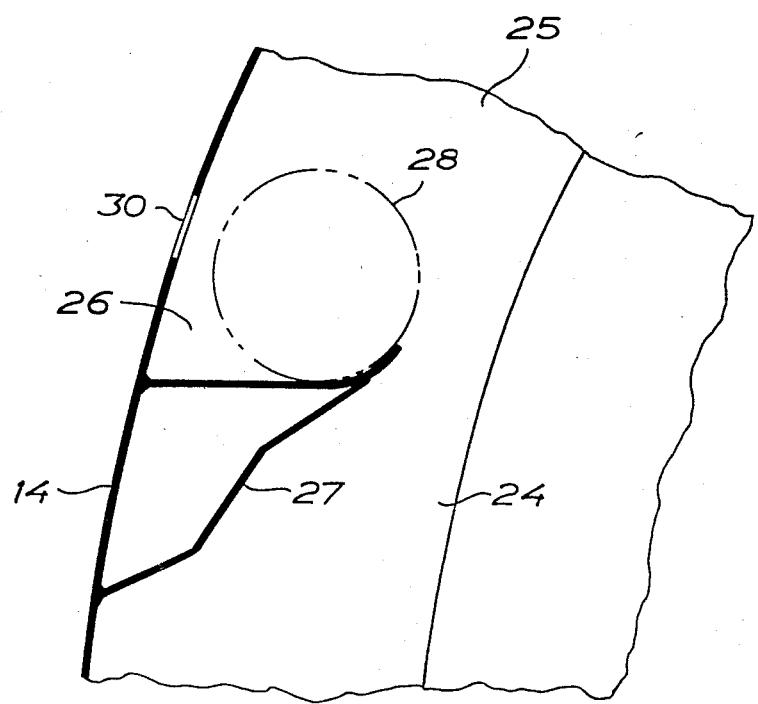

FIG. 4 is an enlarged fragmentary cross sectional view of the cylinder illustrating one compartment thereof, and FIGS. 5A to 5D are diagrammatic views illustrating the operation of the sensors of the apparatus.

The apparatus shown in the drawings comprises a bottom frame 10 supporting a sound insulated cabinet 11, having a supply hopper 12 with a hinged lid 13. A cylinder 14 with a substantially horizontal axis is rotatably supported by rollers 15 mounted in brackets 16 in the cabinet, for rotation about the horizontal axis thereof. The cylinder is provided with a circumferential flange 17 on the outside surface thereof substantially at the longitudinal center of the cylinder, and said flange is engaged by a drive roller 18 of an electric drive motor unit 19, which is supported by a bar 20 extending in parallel to the axis of the cylinder, for sliding movement thereon. The drive unit is biased by a compression spring 21 so as to engage the drive roller 18 under a proper pressure with the flange 17. A counter roller 22 is rotatably mounted in a bracket 23 and engages the flange 17 on the side thereof which is opposite to the drive roller 18.

With reference to FIG. 3 there are provided in the cylinder on the inside surface thereof five circumferential flanges 24 uniformly spaced axially, and these flanges define four circumferential spaces 25. Each space has a number of compartments 26, FIG. 4, formed by a metal sheet structure 27 secured to the cylindrical wall of the cylinder and the flanges 24 by welding. Each compartment is dimensioned to recieve one can only laying in the compartment with the axis of the can extending substantially in parallel to the axis of the cylinder. One can is indicated in FIG. 4 at 28. If it is the intention that standard beverage cans of a length varying from 110 mm to 180 mm shall be handled by the apparatus, then the compartments have a length which is at least slightly larger than 180 mm but is no more than $2 \times 110$ mm$=220$ mm. The metal sheet structure 27 has such a shape that a can received by the compartment formed thereby is prevented from the falling out of the compartment when the compartment during the rotation of the cylinder is moving upwards so as to be carried to the top region of the interior of the cylinder. Cans which are standing in the compartment or in another way are not properly received therein will be discharged from the compartment during the initial movement thereof from the lower region of the inteiror of the cylinder.

In the interior of the cylinder there is supported by the cabinet a substantially horizontal belt conveyor 29 which extends substantially in parallel to the axis of the cylinder over the entire width thereof and projects from the cylinder at one end thereof. The belt conveyor is located in the upper region of the interior of the cylinder so as to receive cans which are discharged from the compartments when the arrive at the upper region of the interior of the cylinder during the rotation thereof.

When the apparatus described is in use a batch of cans to be counted is supplied to the interior of the cylinder 14 through the hopper 12 so as to be received by the lower region of the interior of the cylinder. Then, when the cylinder is being rotated in the clockwise direction as seen in FIG. 2, the cans will be received by the compartments 26 on the inside surface of the cylindrical wall of the cylinder. No more than one can will be received by each compartment but it may happen, of course, that there is no can in one compartment or the other. If a can isproperly positioned in the associated compartment as mentioned above, then it will be carried to the upper region of the interior of the cylinder by the rotation thereof and will be discharged onto the conveyor 29 so as to be carried out of the cylinder again and be deposited in a suitable receiver outside the apparatus. Means are provided to count the cans when they are being carried along by the rotating cylinder.

The said means comprise in the embodiment described optical sensing means. In the cylindrical wall of the cylinder 14 there is provided for each compartment 26 a circular opening 30, FIGS. 3 and 4, and these openings are arranged in a circumferential row for each space 25 with the openings of each space slightly displaced circumferentially in relation to the adjacent row or rows, respectively. Preferably the compartments are correspondingly displaced in relation to each other. Outside the cylinder close to the cylindrical wall thereof there are arranged four sensors 31A, 31B, 31C, and 31D, which are shown diagrammatically in FIGS. 5A to D and one of which, 31D, is shown also in FIG. 2. These sensors should be of the optical reflector type which includes an emitter for emitting a light beam, and a receiver for receiving reflected light. The light is emitted towards the outside surface of the cylindrical wall of the cylinder and the light beam is confined to the path described by the associated openigns 30 when the cylinder is rotating. In the spaces between the openings the light will be reflected back towards the sensor. If this will happen also when an opening passes in front of the sensor depends on the presence of a can in the associated compartment or not. If there is a can in the compartment, the light beam will hit the can and will be reflected towards the sensor. If there is no can, no reflection will take place. Thus, the sensor will be kept activated as long as it senses the reflected light, but in case there is no can in a compartment which is being sensed, the sensor will become deactivated.

A further sensor 32 is provided in order to sense the position of the cylinder in which an opening is opposite the associated sensor. This sensor 32 is of the same type as the sensors 31A to 31D and cooperates with a reflector (mirror) 33. A circumferential row of radially projecting pins 34 are provided on the outside surface of the cylinder to pass between the sensor 32 and the reflector 33 when the cylinder is rotating and thus to cut off the emitted and reflected light beams transmitted between the sensor 32 and the reflector 33. As will be understood, the sensor 32 normally will be activated but will be deactivated each time a pin 34 passes between the sensor and the reflector.

The sensors 31A to 31D in this case are connected in series with each other and with the sensor 32, and the series connection is connected to a counter 35.

Figure 5A:
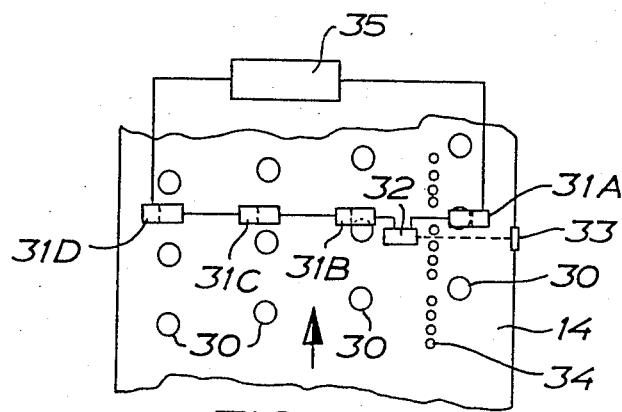
Figure 5B:
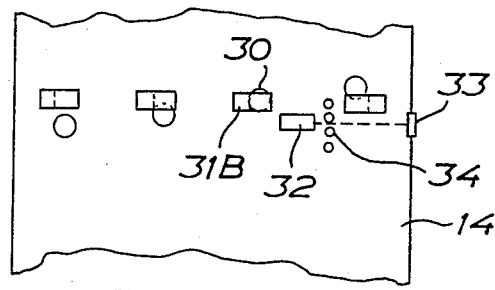

As will be seen from FIGS. 5A to 5B the sensors 31A to 31D are located on a straight line. This line is parallel to the rotational axis of the cylinder. The pins 34 are positioned in relation to the openings in such a way that when an opening is just opposite the associated sensor 31A, B, C, or D, respectively, the associated pin has just cut the light between the sensor 32 and the reflector 33 och the light can now pass through the space between said pin and the following pin, as will be seen in FIG. 5A. The counter may be constructed to make one count each time a pin passes the sensor 32 provided that the sensors 31A to D are at this time all activated. If they are not, which means that the light beam emitted through the opening 30 associated with the said pin is not reflected due to the fact that there is no can in the compartment behind said opening, no count should be made. Electronic and other counters are well known in the art and any suitable type available on the market may be used for the purposes of the invention. For example when all sensors are activated and close a series circuit through the sensors and the counter after the sensor 32 having been deactivated by a passing pin one count will be made. If there is no can in the compartment sensed at that moment, the series circuit will not be closed when the pin has passed the sensor 32, and no count will be made.

Figure 5C:
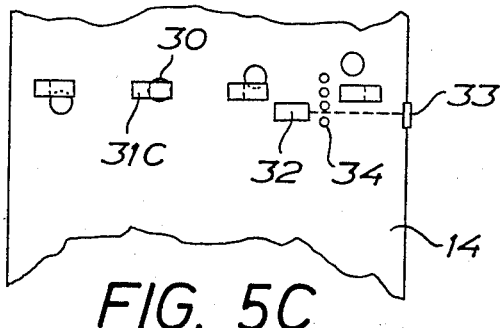
Figure 5D:
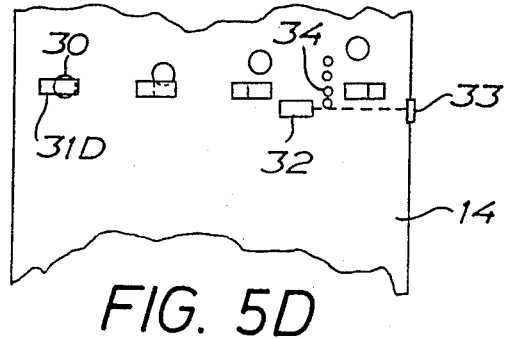

FIG. 5A illustrates sensing of a compartment of an circumferential row, which is at the right end of the cylinder, and FIGS. 5B to D illustrate how the remaining compartments in the other rows are being sensed from right to left in the manner described above.

The embodiment described can be modified. For example, the pins 34 may be replaced by other means such as reflecting and non-reflecting portions on the outside surface of the cylindrical wall of the cylinder, said portions being arranged alternatingly in a circumferential row to be sensed by a reflector type photocell sensor sensing said row when the cylinder is rotating.

We claim:

1. An apparatus for counting substantially cylindrical articles comprising a cylinder having a circumferential series of compartments each for receiving one article, on the inside surface of the cylindrical wall of the cylinder, each compartment extending axially and opening towards the interior of the cylinder, means mounting the cylinder for rotation about a substantially horizontal axis, means for supplying articles to the interior of the cylinder at the lower region thereof, means for delivering articles from the interior of the cylinder at the upper region thereof, means for sensing the presence of an article in each compartment when passing a predetermined position in the rotational path of the compartments, means for sensing the arrival of each compartment to said position, including a reflector type photocell sensor sensing a circumferential path on the outside surface of the cylindrical wall of the cylinder said wall forming an opening for each compartment in said path and a circumferential row of radially projecting pins on the outside surface of the cylinder, one pin for each opening, a second photocell sensor at one side of the row of pins, and a reflector at the other side of the row of pins opposite to said seconde photocell sensor, and means for making one count in dependence on the sensing of an article in said position.

2. An apparatus for counting substantially cylindrical articles comprising a cylinder having a circumferential series of compartments each for receiving one article, on the inside surface of the cylindrical wall of the cylinder, each compartment extending axially and opening towards the interior of the cylinder, means mounting the cylinder for rotation about a substantially horizontal axis, means for supplying articles to the interior of the cylinder at the lower region thereof, means for delivering articles from the interior of the cylinder at the upper region thereof, means for sensing the presence of an article in each compartment when passing a predetermined position in the rotation path of the compartments, means for sensing the arrival of each compartment to said position, including a reflector type photocell sensor sensing a circumferential path on the outside surface of the cylindrical wall of the cylinder, said wall forming an opening for each compartment in said path, and wherein said means for sensing the arrival of each compartment to said position comprises a circumferential row of marks one for each opening, and a second sensor for sensing said marks.

* * * * *